United States Patent
Mancini et al.

[11] 3,724,225
[45] Apr. 3, 1973

[54] SEPARATION OF CARBON DIOXIDE FROM A NATURAL GAS STREAM

[75] Inventors: Paul A. Mancini, New York, N.Y.; Walter G. May, Summit, N.J.

[73] Assignee: Esso Research and Engineering Company

[22] Filed: Feb. 25, 1970

[21] Appl. No.: 13,931

[52] U.S. Cl. ................................................62/12
[51] Int. Cl. ............................F25j 1/00, F25j 1/02
[58] Field of Search...........62/10, 12, 23, 24, 35, 40, 62/9, 11

[56] References Cited

UNITED STATES PATENTS

| | | | |
|---|---|---|---|
| 2,900,797 | 8/1959 | Kurata | 62/12 |
| 3,203,192 | 8/1965 | Tafreshi | 62/12 |
| 3,283,521 | 11/1966 | Harmens | 62/40 |
| 3,306,057 | 2/1967 | Harmens | 62/40 |
| 3,376,709 | 4/1968 | Dickey | 62/23 |
| 2,062,537 | 12/1936 | Twomey | 62/12 |
| 2,082,189 | 6/1937 | Twomey | 62/12 |
| 3,312,073 | 4/1967 | Jackson | 62/12 |
| 3,398,077 | 8/1968 | Crownover | 62/12 |
| 3,224,208 | 12/1965 | Schlumberger | 62/12 |

Primary Examiner—Norman Yudkoff
Assistant Examiner—Arthur F. Purcell
Attorney—Manahan and Wright and Donald F. Wohlers

[57] ABSTRACT

A process for the removal of carbon dioxide from a natural gas stream during the liquefaction of said gas stream. The gas stream containing carbon dioxide is cooled, resulting in the crystallization of carbon dioxide from the totally condensed liquid stream. A slurry comprising the crystallized carbon dioxide and a portion of the liquid is recycled, providing a fraction of the refrigeration required for cooling the gas stream.

1 Claim, 2 Drawing Figures

PATENTED APR 3 1973
3,724,225

Paul A. Mancini
Walter G. May — Inventors

By Donald F. Wohlers
Attorney

SEPARATION OF CARBON DIOXIDE FROM A NATURAL GAS STREAM

BACKGROUND OF THE DISCLOSURE

The instant invention is directed to a new and novel process for the removal of carbon dioxide from a natural gas stream. More specifically, the instant invention is directed to a process for the removal of carbon dioxide during the liquefaction of a natural gas stream in which it is contained. Still more specifically, the instant invention is directed to a process for the removal of carbon dioxide from a natural gas stream by crystallization of the carbon dioxide from the completely liquefied neutral gas stream and by subsequent removal of the crystallized carbon dioxide from the stream.

Liquefaction of natural gas has become, in recent years, a common and often used method for natural gas storage and transportation. This has resulted in a proliferation of methods and schemes for liquefying natural gas. Since carbon dioxide is usually present in varying amounts in natural gas streams, one step common to all the prior art processes for liquefying natural gas streams is the removal of the carbon dioxide impurity. In the prior art, carbon dioxide has been removed from the gas stream prior to the liquefaction of the stream. In addition to the obvious need to reduce the concentration of non-combustible carbon dioxide to an acceptable level in the natural gas fuel, carbon dioxide removal took place, in the prior art, before liquefaction in order to prevent carbon dioxide crystals from coating the heat exchange surfaces during liquefaction. This coating leads to decreased heat exchange efficiencies and ultimately to plugging of the heat exchanger flow passages.

In order to prevent such unacceptable results, the prior art processes include a conventional gas scrubber with an aqueous absorbent solution such as monoethanolamine or potassium carbonate to separate out the carbon dioxide prior to cooling and liquefaction of the natural gas stream. Conventional treatment is expensive, but in comparison to the possible catastrophic consequences resulting from failure to remove carbon dioxide, in the prior art, such costs seem reasonable.

A secondary reason for removal of carbon dioxide before liquefaction was to save the expense of the additional refrigeration required for cooling carbon dioxide gas from room temperature to carbon dioxide solid at cryogenic temperature.

It is evident that if a process were invented whereby the carbon dioxide is liquefied along with the remainder of the natural gas stream, the pretreatment step would be eliminated and the cost of removing crystalline carbon dioxide from the natural gas stream after liquefaction would be considerably less than the cost of removing gaseous carbon dioxide from the natural gas stream before liquefaction as is done in the prior art. In order to make these savings in the overall cost of natural gas liquefaction, the problem of coating and plugging the heat exchangers with carbon dioxide must be solved.

SUMMARY OF THE INVENTION

The instant invention is directed to a process in which carbon dioxide is removed from a natural gas stream by crystallizing the carbon dioxide after liquefaction of the stream and thence separating the carbon dioxide solids from the liquefied natural gas product. This crystallization process is made possible by solving the problem of solid carbon dioxide coating of the liquefaction heat exchange surfaces. This is accomplished by operating the liquefaction of the carbon dioxide-natural gas mixture under controlled conditions of temperature and pressure so that crystallization of the carbon dioxide does not begin before the stream is totally condensed. By conducting the process in this way, the liquefied stream itself possesses sufficient momentum so as to entrain the solids and thus prevent their adhesion to the walls of the heat exchange surfaces.

The problem of added costs resulting from the additional refrigeration required to crystallize the carbon dioxide during liquefaction is solved by recovering much of the refrigeration available in the carbon dioxide crystals by recycling the carbon dioxide solid in a slurry with liquefied natural gas in indirect heat transfer relationship to the natural gas-carbon dioxide incoming stream.

In accordance with the process of the instant invention, carbon dioxide is removed from a natural gas stream in a series of steps including cooling the stream under carefully controlled thermodynamic conditions until the stream is totally condensed, then further cooling the condensed stream until the carbon dioxide is crystallized out and thereafter, separating the bulk of the natural gas-carbon dioxide-free, liquid stream while recycling a slurry of the crystallized carbon dioxide, suspended in a small portion of the liquid phase natural gas mixture, in indirect heat transfer relationship with the incoming gas stream.

BRIEF DESCRIPTION OF THE DRAWING

The invention may be better understood by reference to the accompanying drawing of which.

DETAILED DESCRIPTION

Figures 1, 2:
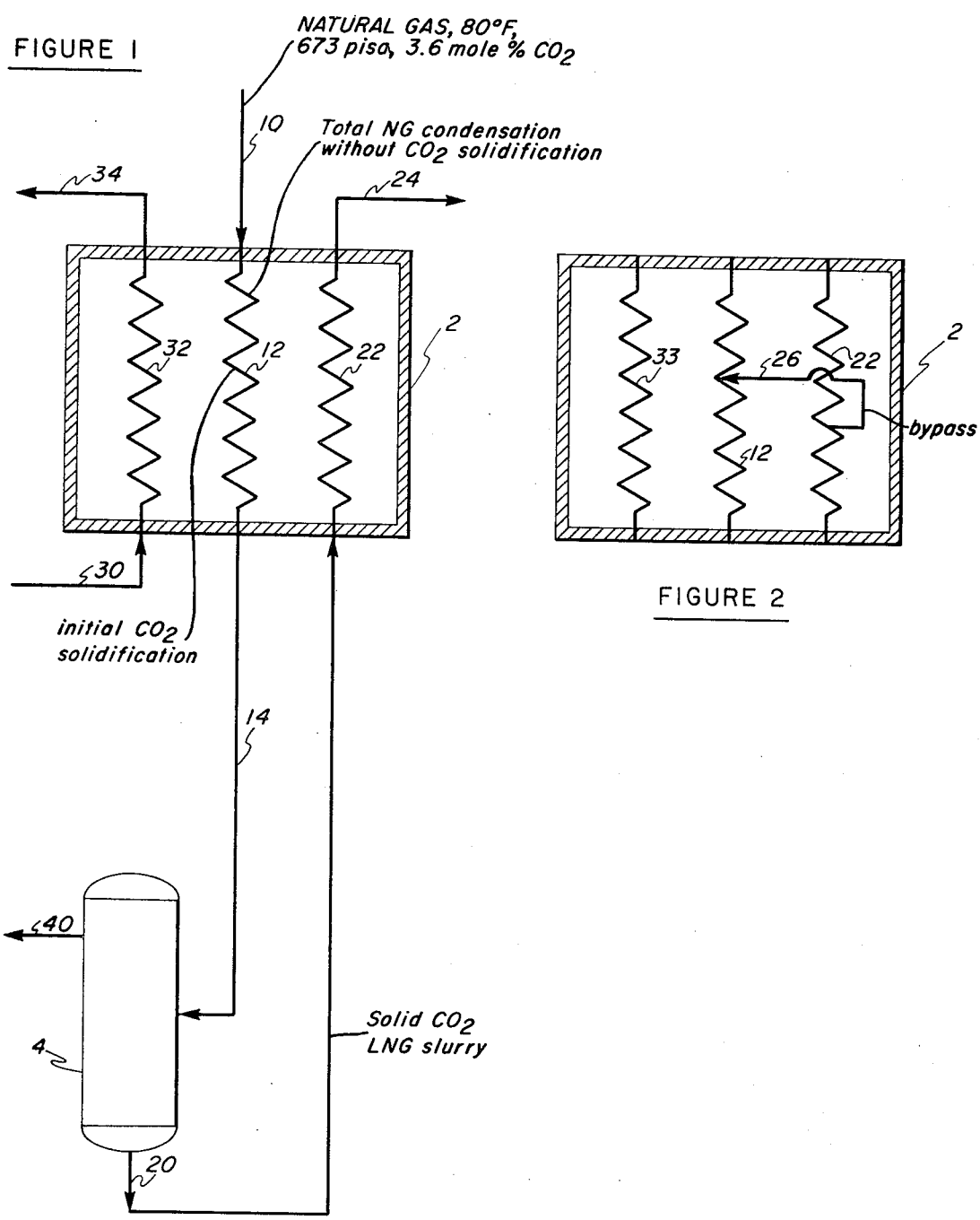
FIG. 1 is a schematic representation of the process of the instant invention.
FIG. 2 is a schematic representation of a portion of the process of the instant invention illustrating an alternate embodiment.

FIG. 1 is a schematic representation of the process of the instant invention. A natural gas feed stream, whose major constituent is methane, and containing a known fraction of carbon dioxide is fed through a conduit 10 into a plurality of heat exchange stages denoted for convenience as cold box 2. In cold box 2 the incoming gaseous mixture stream is cooled while flowing through a plurality of conduits schematically represented as heat exchange stages 12. The incoming natural gas stream exiting the conduit 10 enters stages 12 at a temperature of about 80°F.

The incoming natural gas stream in heat exchange stages 12 is cooled, in part, by an external refrigerant which enters a plurality of heat exchange stages 32, in the cold box 2, by means of a conduit 30. Stages 12 and 32 are disposed in indirect heat transfer relationship with each other in the cold box 2. In a preferred embodiment, stages 12 and 32 are disposed in countercurrent heat transfer relationship with each other. The refrigerant enters stages 32 at a temperature of approximately −270°F.

The incoming natural gas stream is carefully cooled under regulated thermodynamic conditions so that the vapor begins to condense. As cooling continues, more and more of the vapor is condensed until the entire stream is a liquid mixture comprising liquefied natural gas and liquid carbon dioxide. In the final stages of cooling, the carbon dioxide crystallizes out as a solid. It should be emphasized that the thermodynamic conditions are carefully regulated as a function of the composition of the stream so that the phase change sequence described above is not varied. Thus, the carbon dioxide never crystallizes out until the stream is cooled to a sufficiently low temperature so that the stream is entirely in the liquid phase with no vapor present. This is very important since a gaseous stream does not possess sufficient momentum to entrain the carbon dioxide solid crystals to prevent their coating the heat exchange surfaces.

The incoming natural gas stream leaves the plurality of heat exchange surfaces 12 in cold box 2 at a temperature of approximately $-260°F$. as a two-phase solid liquid stream through conduit 14. Meanwhile, the external refrigerant in the plurality of heat exchange stages 32 is heated in the cold box 2 exiting said stages 32 as a gas at a temperature of approximately 70°F. into a conduit 34. The external refrigerant in conduit 34 may be compressed, cooled and recycled (not shown) and returned to conduit 30 for re-use.

The stream in conduit 14 which comprises essentially pure solid carbon dioxide crystals in a liquid which is essentially pure natural gas, is fed into a settling drum 4. The solid carbon dioxide crystals have a greater density than the liquid natural gas. Thus, the crystals settle to the bottom of the drum. The essentially pure liquefied natural gas is taken off as a final purified product through a conduit 40 disposed in the upper vertical section of the drum 4.

In order to optimize the process of the instant invention, it is desirable to recover the refrigeration necessary to liquefy and crystallize the carbon dioxide. That is, in order to gain the full advantage of eliminating the conventional treatment step of removal of carbon dioxide from natural gas prior to liquefaction, it is necessary to provide refrigeration to crystallize the carbon dioxide out of the natural gas-carbon dioxide mixture. In the process of the instant invention this refrigeration is recovered by means of a recycle stream. All of the solid carbon dioxide crystals, along with a small portion of the liquid phase liquefied natural gas, is recycled back into the cold box as a cold slurry by means of a conduit 20 disposed between the bottom of the settling drum 4 and the cold box 2. Conduit 20 directs the solid-liquid slurry into a plurality of heat exchange stages 22 which are in indirect heat transfer relationship with the incoming natural gas stream in the stages 12. In a preferred embodiment, the heat transfer stages 12 and 22 are in countercurrent heat exchange relationship with each other. The cold solid-liquid slurry which enters stages 22 at approximately the settling drum equilibrium temperature of approximately $-260°$ is heated while providing the refrigeration necessary to crystallize the gaseous carbon dioxide component. As a result, the solid-liquid slurry is regasified, exiting said stages 22 through a conduit 24 as a single-phase natural gas-carbon dioxide mixture. In a preferred embodiment, the approximately 70°F. gaseous mixture in conduit 24 is employed as a fuel at the liquefaction site.

It should be understood that the alternate preferred embodiment of the process of the instant invention which comprises recycling the carbon dioxide crystals in a liquefied natural gas slurry is not exclusive. Thus, by employing additional refrigerant through heat exchange stages 32, the step of recycling the carbon dioxide-natural gas slurry may be eliminated. Therefore, it should be appreciated that FIG. 1 illustrates two preferred embodiments of the instant invention.

Turning now to FIG. 2, another preferred embodiment of the instant invention is illustrated. The embodiment illustrated in FIG. 2 is a variation of the preferred embodiment in which the carbon dioxide crystals are recycled in indirect heat transfer relationship with the incoming natural gas stream. In the preferred embodiment illustrated in FIG. 2, instead of merely recycling the cold solid-liquid slurry flowing through stages 22 in countercurrent heat transfer relationship with the incoming stream flowing through heat transfer stages 12, a portion of the solid-liquid slurry is bypassed by way of a conduit 26 and injected back into the incoming stream contained in heat transfer stages 12. The solid-rich slurry which is injected back into stages 12 is a coarse material possessing considerable momentum. Thus, this stream is used to scour the walls of the heat transfer surfaces of stage 12. In this way, the preferred embodiment herein illustrated provides a back-up mode in case the conditions under which the crystallization is designed to occur are disturbed.

If the thermodynamic conditions are somehow disturbed, it is possible that carbon dioxide crystallization may occur before the natural gas is fully condensed. In that case, the walls of the heat exchange stages 12 become coated with solid carbon dioxide. The re-injection embodiment, by scouring the walls of stages 12, prevents such an effect from causing shutdown of the process. As far as possible, conduit 26 will be disposed so that the slurry taken from stage 22 is injected back into stage 12 at approximately the same temperature as the stream in stage 12 being scoured. The purpose of this temperature "matching" is to minimize irreversible mixing losses which reduce the thermodynamic efficiency of the process. It should be emphasized that the amount of slurry that is re-injected into the incoming stream represents only a fraction of the recycle stream. The remainder of the slurry stream in stages 22 is regasified and exits through conduit 24 as illustrated in FIG. 1.

EXAMPLE

This example relates to the embodiment in which carbon dioxide crystals are recycled in a liquefied natural gas slurry without bypassing said stream to scour the walls. On the basis of a unit period of time, 1.15 pounds of natural gas are fed through conduit 10 in a gaseous mixture with 0.118 pound of carbon dioxide. Therefore, the natural gas feed mixture contains about 3.6 mol percent carbon dioxide. The mixture enters the cold box 2 at a pressure of 673 psia and a temperature of 80°F. The gaseous mixture is cooled at constant pressure in the cold box 2. At about $-105°F$. condensation begins. At about $-112°F$. the mixture is totally condensed. As the temperature is decreased further solid carbon dioxide crystals appear. The temperature is thereafter decreased until the liquid-solid mixture stream exits cold box 2 through conduit 14 at a temperature of about −260°F. and 673 psia. The solid and liquid phases are separated in the settling drum 4. 1 pound of natural gas is taken off as product at a temperature of −260°F. and a pressure of 673 psia. A slurry comprising 0.118 pound of carbon dioxide solid crystals and 0.15 pound of liquefied natural gas is recycled through conduit 20 back into the cold box 2 at −260°F. The slurry is heated and regasified in the cold box 2 exiting through conduit 24 at a temperature of 70°F. The regasified mixture comprises 0.118 pound of carbon dioxide and 0.15 pound of methane.

While the above-described preferred embodiments and example illustrate the invention in detail, it should be understood that the present invention in its broadest aspects is not necessarily limited to the specific embodiments, conditions and examples shown herein. Other embodiments and examples which do not depart from the scope and spirit of this invention should be understood to be covered by the invention as defined by the claims.

What is claimed is:

1. A process for removal of carbon dioxide from a natural gas-carbon dioxide mixture while said mixture is being liquefied comprising the following steps in combination:

a. partially cooling an incoming gaseous stream comprising said natural gas-carbon dioxide mixture by indirect heat transfer with an external refrigerant at a pressure selected to avoid crystallization of carbon dioxide until said stream is totally condensed;

b. further cooling said incoming liquid mixture by indirect heat transfer whereby a fraction of said mixture comprising essentially all of said carbon dioxide is crystallized and a two-phase solid-liquid mixture is formed;

c. separating a solid enriched stream comprising solid carbon dioxide particles in liquefied natural gas from the major portion of the liquefied natural gas;

d. recycling said solid enriched stream in indirect heat transfer relationship with said incoming stream, whereby said incoming stream is cooled and said recycle stream is heated;

e. bypassing a portion of said recycle stream into said incoming stream whereby solid crystals deposited on the walls of the line carrying said incoming stream is removed by the scouring effect of said solid-enriched recycle stream;

f. further heating and regasifying the portion of said recycle steam not bypassed.

* * * * *